(12) United States Patent
Baumler et al.

(10) Patent No.: US 7,448,944 B1
(45) Date of Patent: Nov. 11, 2008

(54) ANIMAL CARCASS LIFT DEVICE

(75) Inventors: Allan C. Baumler, Dyersville, IA (US);
Steven J. Steffen, Dyersville, IA (US)

(73) Assignee: Lextron, Inc., Greeley, CO (US)

( * ) Notice: Subject to any disclaimer, the term of this patent is extended or adjusted under 35 U.S.C. 154(b) by 0 days.

(21) Appl. No.: 11/761,201

(22) Filed: Jun. 11, 2007

(51) Int. Cl.
*A22B 7/00* (2006.01)

(52) U.S. Cl. ..................................................... 452/187

(58) Field of Classification Search ........................ None
See application file for complete search history.

(56) References Cited

U.S. PATENT DOCUMENTS

| | | | | |
|---|---|---|---|---|
| 3,557,693 A | * | 1/1971 | Kuchenbecker et al. | 101/93.14 |
| 5,339,752 A | * | 8/1994 | Lewis | 110/194 |
| 5,526,757 A | | 6/1996 | Yang | |
| 5,699,745 A | | 12/1997 | Kaehr | |
| 5,725,112 A | * | 3/1998 | Thorby | 212/180 |
| 5,799,597 A | | 9/1998 | Kaehr | |
| 5,926,933 A | | 7/1999 | Kaehr | |
| 6,138,991 A | * | 10/2000 | Myers, Jr. | 254/323 |
| 6,397,764 B1 | | 6/2002 | Massey | |
| 6,401,632 B1 | * | 6/2002 | Kaehr | 110/186 |
| 6,705,821 B2 | * | 3/2004 | Philipps et al. | 414/462 |
| 6,994,618 B1 | * | 2/2006 | Syers | 452/187 |
| 7,004,088 B2 | * | 2/2006 | Ford | 110/241 |
| RE39,442 E | | 12/2006 | Massey | |

OTHER PUBLICATIONS

"Load N' Lock" Earth Smart Solutions Inc., availble at http://www.earthsmartsolutions.com/loadnlock.php, printed Mar. 13, 2007, 1 page.
"Welcome to earthsmartsolutions.com!" Earth Smart Solutions Inc., available at http://ww.earthsmartsolutions.com, printed Mar. 13, 2007, 1 page.

* cited by examiner

*Primary Examiner*—Thomas Price
(74) *Attorney, Agent, or Firm*—Sheridan Ross P.C.

(57) ABSTRACT

An animal carcass lift device is especially adapted for use with animal carcass incinerators or cremators found at various agricultural locations. The lift device takes advantage of two rotation points in order to precisely manipulate an attached animal carcass so that it may be conveniently loaded within the incinerator. The lift device includes a power assist mechanism such as a winch to raise or lower the animal carcass.

7 Claims, 4 Drawing Sheets

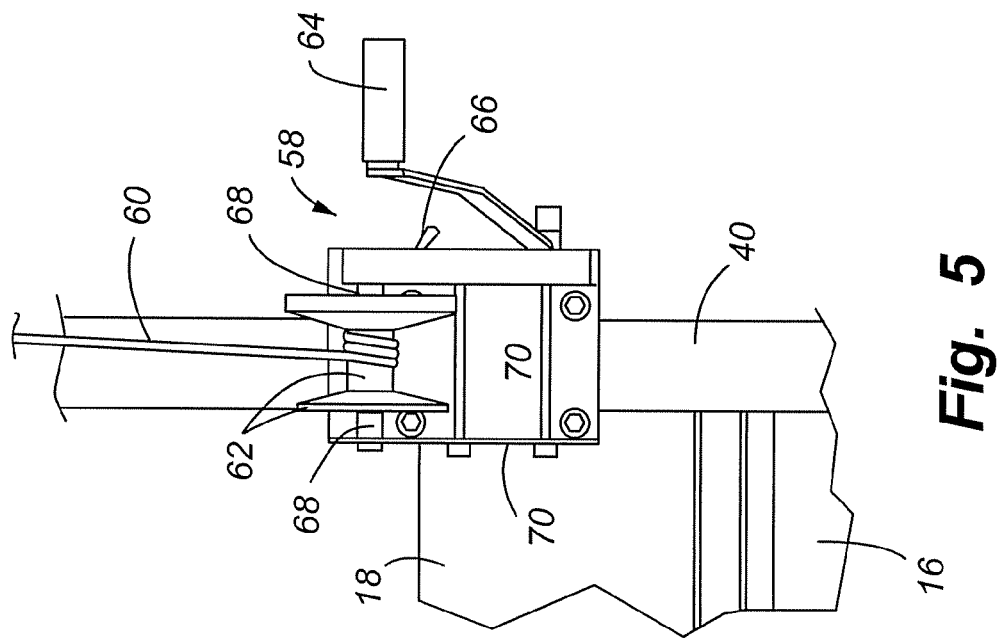
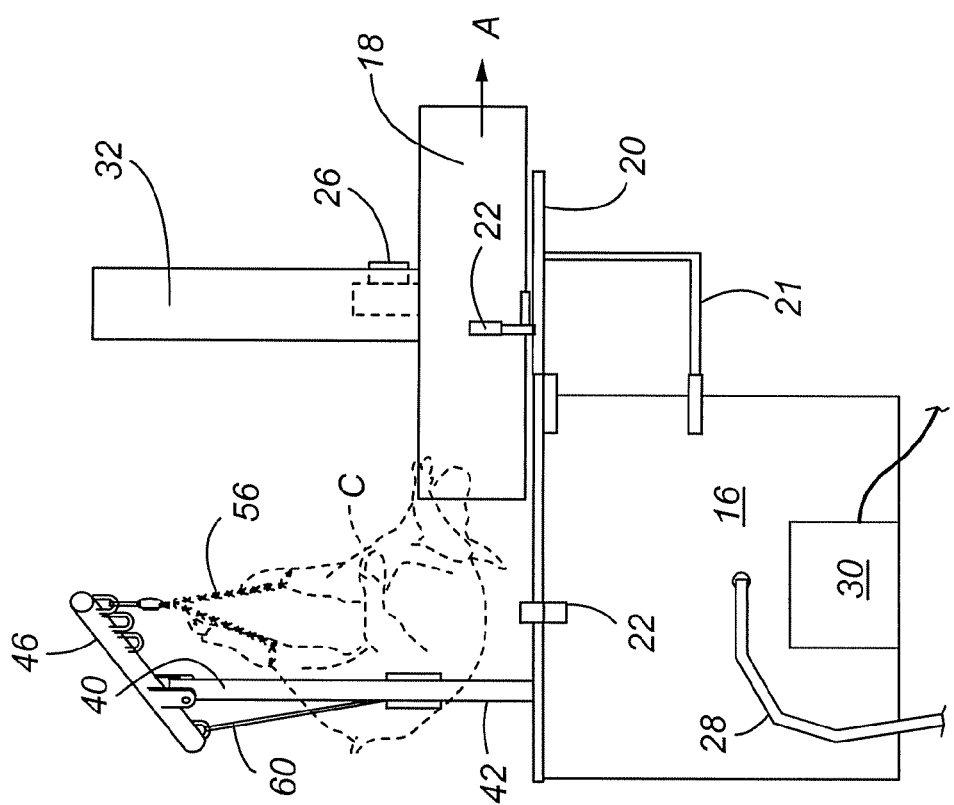
*Fig. 5*
*Fig. 4*

ANIMAL CARCASS LIFT DEVICE

FIELD OF THE INVENTION

The present invention relates to lift devices, and more particularly, to lift devices integrated with incinerators especially adapted for incinerating animal carcasses.

BACKGROUND OF THE INVENTION

In the agricultural sector, it is necessary to dispose of livestock and poultry carcasses for various reasons. Livestock and poultry carcasses must be disposed of after the animal has been slaughtered. For both livestock and poultry, diseased or dead animals must also be disposed of properly. Because of various state and federal environmental regulations, livestock and poultry producers cannot simply bury or "throw away" the animal carcasses. Particularly for diseased animals, it is important that the carcasses be properly disposed of to prevent the spread of infectious diseases to both humans and animals.

One traditional method for disposing animal carcasses is cremating the remains in an industrial incinerator or cremator. For many smaller livestock and poultry producers, animal carcasses must be transported to the location of the incinerator because the producer does not have an incinerator. Transport of animal carcasses is also a regulated activity such that a producer cannot simply load the carcasses onto an open trailer and then transport them to the incinerator location. In many states, the transporting vehicle must be licensed to handle the regulated load. In the event an animal carcass load accidentally contacts the ground during transportation, such as in a traffic accident, the carcasses are treated as a biohazard, and extreme measures are taken to clean the biohazard "spill".

Because of regulations concerning disposal of animal carcasses, and therefore the increased costs incurred in handling the carcasses, a number of smaller incinerators/cremators have been developed to accommodate the needs of those producers who must routinely destroy carcasses, but wish to avoid the additional effort and cost associated with disposing of the carcasses by transport to another location. These smaller, more portable incinerators do not have the capacity to incinerate carcasses at the same rate of the larger industrial incinerators; however, many producers have realized savings in the ability to locally incinerate the carcasses thereby eliminating the need to temporarily store and transport the carcasses.

Some examples of carcass incinerators include the ones disclosed in U.S. Pat. Nos. 5,339,752; 5,699,745; 5,926,933; and 6,397,764.

While each of these incinerators may be adequate for their intended purpose, there is a need to provide some lift capability for lifting the animal carcasses into the incinerator, but minimizing human contact with the carcasses. Accordingly, there is a need to provide a lift device that can efficiently and accurately lift and place the carcasses directly into the incinerator.

In accordance with the present invention, it is therefore one object of the invention to provide a lift device that is integrated with a carcass incinerator/cremator.

It is yet another object of the present invention to provide a cost effective, yet simple to use and efficient life device that may be directly attached to the incinerator, thereby minimizing cost and complexity associated with the lift device.

It is yet another object of the present invention to provide a lift device that is easily adaptable to raise, hold, and otherwise manipulate various sized animal carcasses so that the lift device may be used universally with any type of carcass that may be of a size that can be incinerated in the designated incinerator/cremator.

SUMMARY OF THE INVENTION

In accordance with the present invention, an animal carcass lift device is provided. In one aspect of the invention, it is an animal carcass lift device specially adapted for handling carcasses of many different sizes. In another aspect of the present invention, it may be considered a combination of the lift device and incinerator wherein the lift device is secured to the incinerator and therefore, is available for use at all times with the incinerator. In yet another aspect of the present invention, a method is provided for manipulating animal carcasses so that the carcasses may be safely and efficiently loaded within the incinerator.

In a preferred embodiment of the present invention, the lift device includes a vertical support or mast that is secured to a base. The base is attached to the incinerator. A lower end of the vertical support is telescopically received within the base, therefore, allowing the vertical support to rotate within the base. Smooth rotation of the vertical support within the base can be achieved by lubrication, or bearings may be used between the inner tubular surface of the base and the outer tubular surface of the vertical support. A rotatable arm is pinned to the upper end of the vertical support. A first end of the rotatable arm is controlled by a cable. The cable in turn is controlled by a winch assembly. A second or opposite end of the rotatable arm includes connection hardware that allows the animal carcass to be secured to the second end of the rotatable arm. The connection hardware may include a plurality of attachment rings spaced from one another and secured to the rotatable arm. Chains or straps may be used to then secure the animal carcass to the rotatable arm by routing the chains or straps through the attachment rings. The winch may be manually operated, or a motor may be associated with the winch to control the retraction or extension of the cable. Retraction of the cable causes the second end of the rotatable arm to rotate upwards thereby lifting the carcass, while extension of the cable from the winch lowers the carcass.

The location of attachment of the lift device on the incinerator is such that the animal carcass may be loaded into the incinerator by simply lifting the carcass and rotating the carcass over the open lid of the incinerator.

Further features and advantages of the present invention will become apparent from the following detailed description, taken in conjunction with the drawings.

BRIEF DESCRIPTION OF THE DRAWINGS

FIG. 4 is another end-view illustrating the lift device being rotated to center the animal carcass over the open chamber of the incinerator; and FIG. 5 is an enlarged elevation view of the winch assembly.

DETAILED DESCRIPTION

Figure 1:
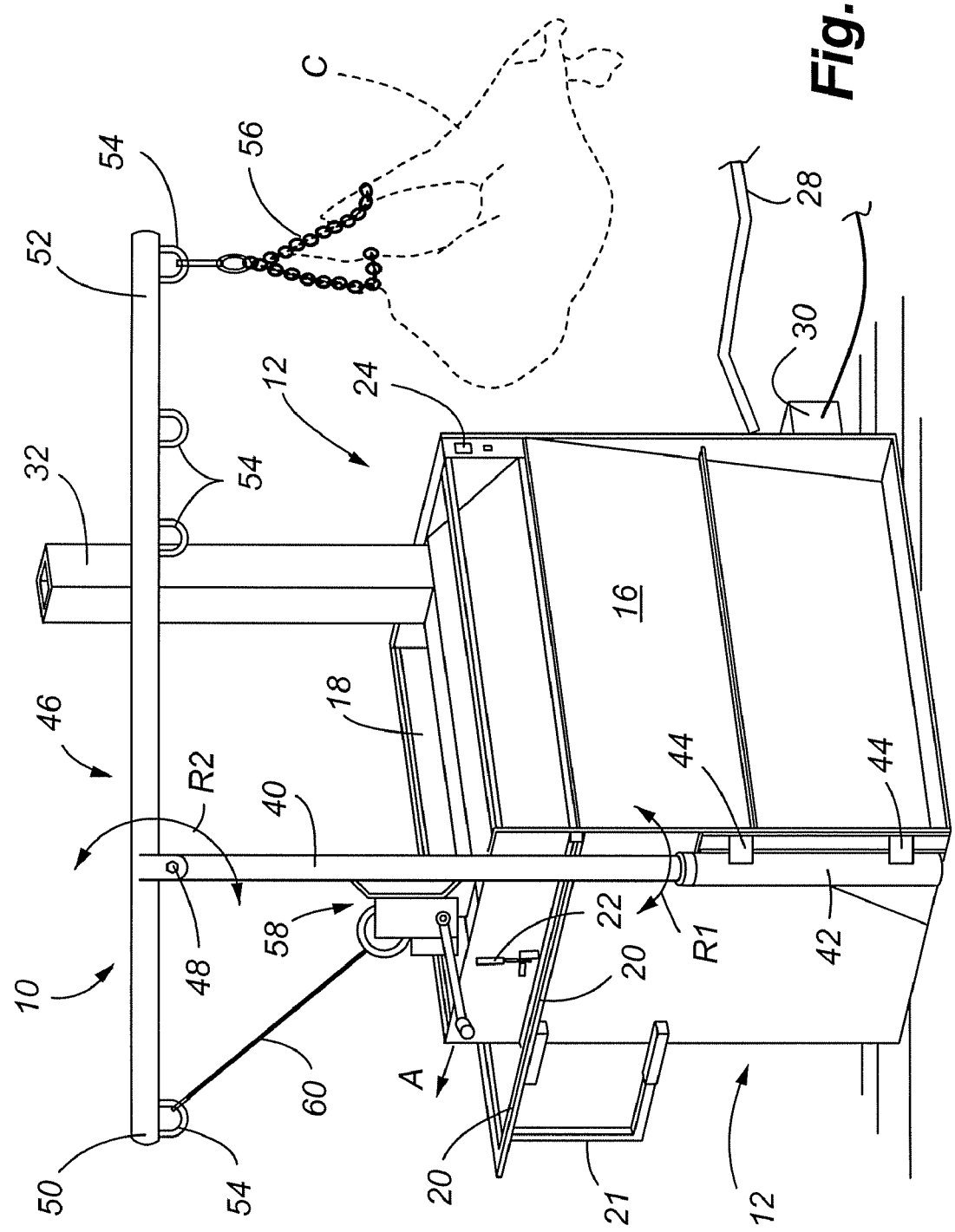
FIG. 1 is a perspective view of the lift device of the present invention secured to an animal carcass incinerator.
Figure 2:
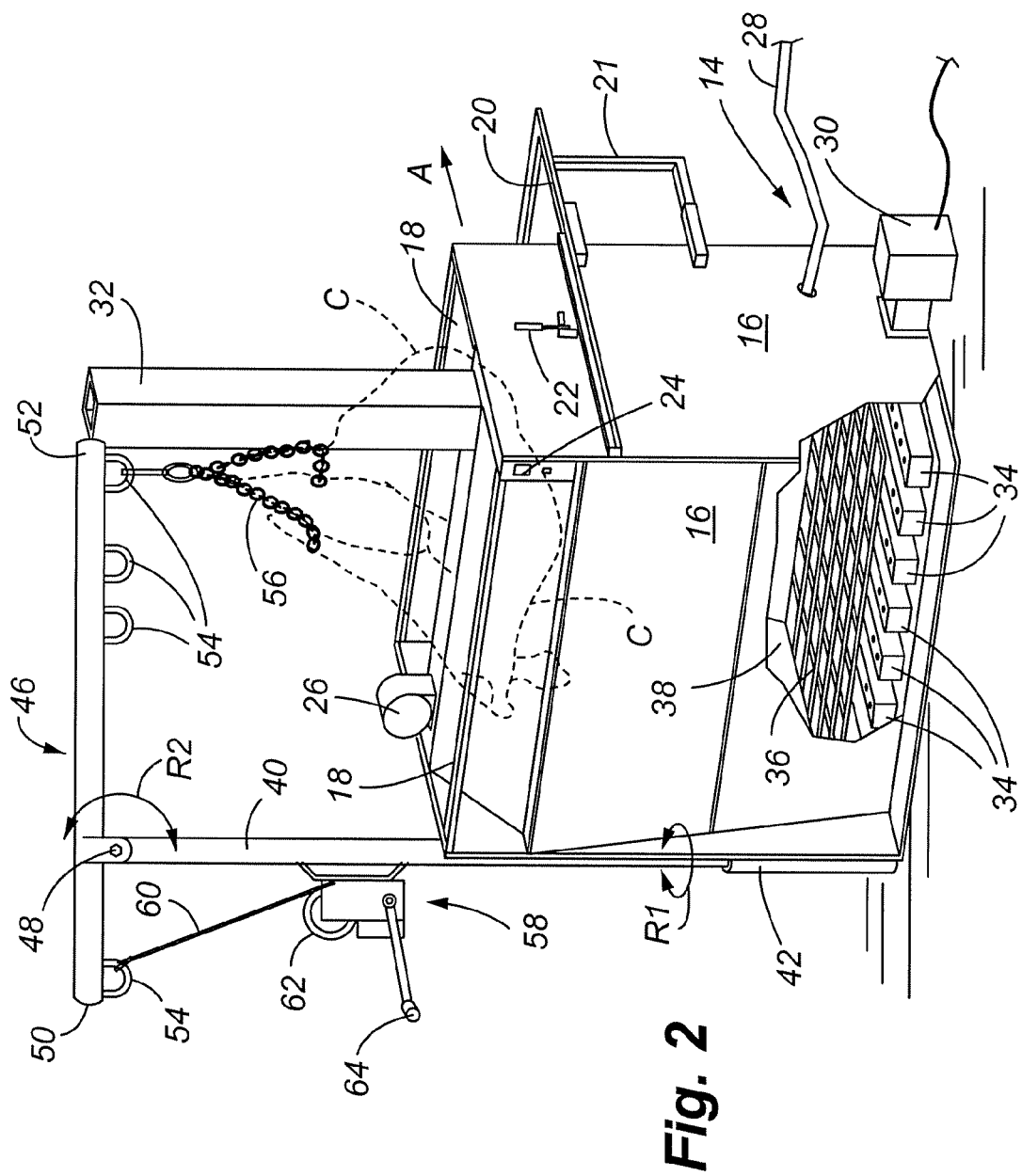
FIG. 2 is another perspective view of the lift device secured to the incinerator.
Figure 3:
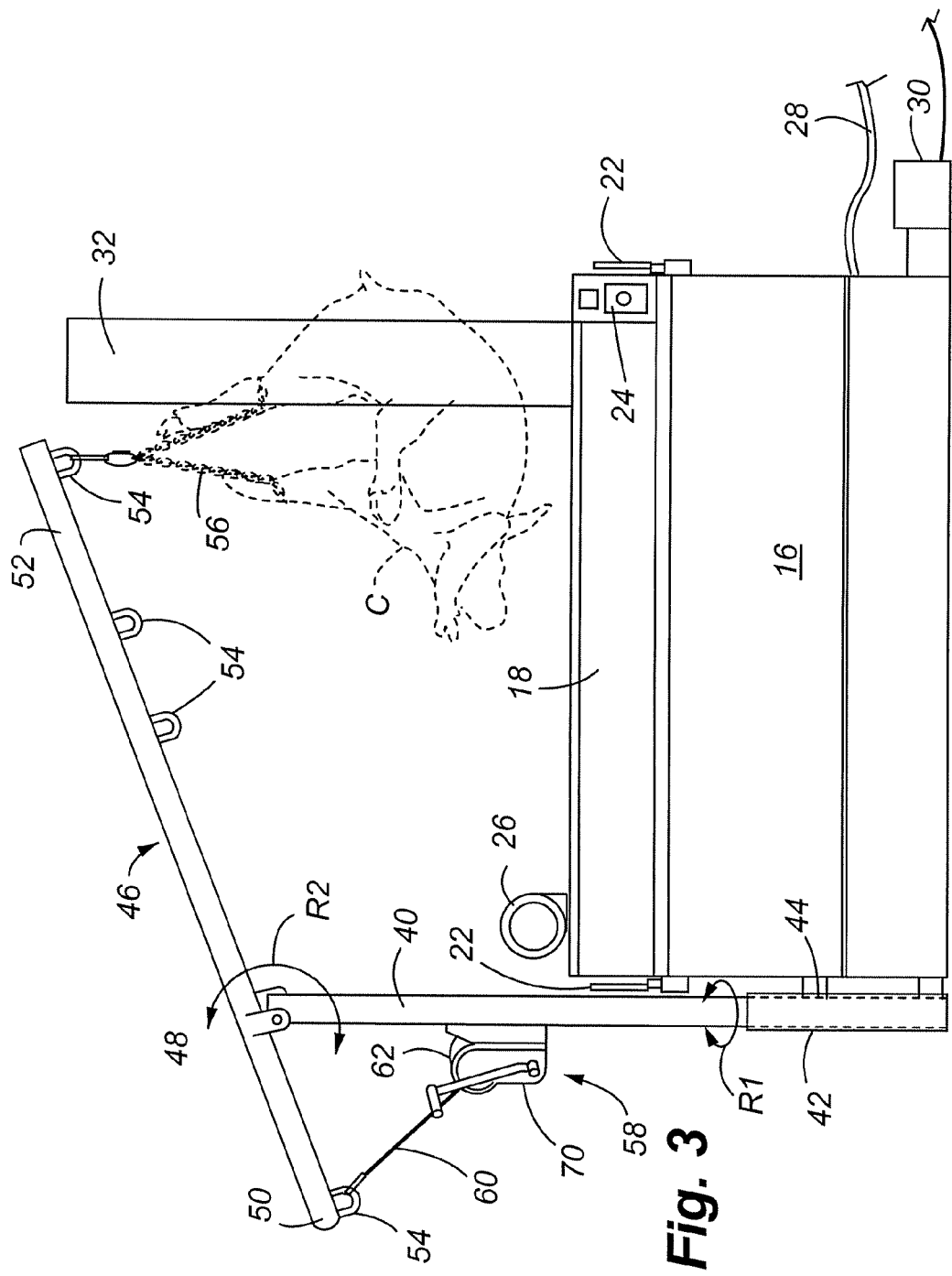
FIG. 3 is a side view of the lift device and incinerator wherein the winch has been operated to lift an animal carcass to an appropriate level for loading within the incinerator.

FIGS. 1 and 2 illustrate the lift device 10 of the present invention secured to an incinerator 12. The incinerator 12 is intended to represent a standard incinerator device that may be found at a feedlot, grower, or other agricultural site that can be operated for the incineration of animal carcasses. Beginning first with a description of the incinerator 12, such a device may include sidewalls 16, and a lid 18, which is opened to receive the animal carcasses. An interior chamber 38 may include a desired burner arrangement that incinerates the carcass when placed within the chamber. As shown, burners 34 may be placed on the bottom of the chamber and a grill 36 is spaced above the burners 34. The animal carcasses rest on the grill 36. Typically, the incinerator 12 uses natural gas or propane as a fuel source for the burners. As also shown in FIG. 1, the particular style of the incinerator 12 includes a slide rail 20 which allows the opening of the lid 18 by sliding the lid 18 on the slide rail 20 in the direction of arrow A. The slide rail 20 may be secured to the sidewalls as by one or more supports 21. Optionally, a lid lock 22 may be provided to lock the lid to the incinerator in order to prevent inadvertent access to the interior chamber while a carcass is being incinerated. A control panel 24 may be provided for controlling the basic functioning of the incinerator such as the particular temperature of the interior chamber, the length of time in which the chamber operates, and other selected parameters. A thermostat/temperature sensor 26 may be mounted to the lid or sidewalls in order to monitor the temperature, and provide a feedback control signal to the control panel 24. A source of gas 28 may enter the chamber through sidewall 16 in order to provide a flow of gas to the burners 34 within the interior chamber 38. One or more fans or blowers 30 may be provided to circulate air within the incinerator, thereby insuring a more complete burn of the carcass through convection. An exhaust stack 32 may be provided at a desired height to evacuate waste gas generated from the burning of the carcasses.

Now with reference to the lift device 10 of the present invention, the device includes a base 42 secured to one of the sidewalls 16 as by connection flanges 44. As shown, the base 42 is a tubular member. A vertical support or mast 40 has a lower end (not shown) telescopically received within the base 42. As shown by rotational arrow R1, the vertical support 40 may rotate with respect to the base 42 as shown. In order to allow ease of rotation, the vertical support may simply be lubricated with respect to the base, or a set of bearings (not shown) may be placed between the inserted end of the vertical support 40 and the inner surface of the base 46. A rotatable arm 46 is attached to the upper end of the support 40 as by a pin 48. Accordingly, the rotatable arm 46 may rotate with respect to the vertical support 40 in the manner shown by rotational arrow R2. A first end 50 of the rotatable arm 46 may include attachment hardware such as a ring 54 that attaches to cable 60. The second end 52 of the rotatable arm 46 may include additional attachment hardware such as additional rings 54. As shown, the most distally located ring 54 on the second end 52 is used to secure an animal carcass C that is to be incinerated. A chain or strap 56 is used to secure the carcass C to the ring 54.

In order to control the rotatable position of the arm 46 and therefore to raise or lower the carcass C, a winch 58 is used. The winch 58 is secured to the vertical support 40. The winch 58 represents a mechanical device that has the capability to selectively retract or extend the cable 60, thereby raising or lowering the carcass C. In the preferred embodiment shown best in FIG. 5, the winch 58 includes a housing 70, and a drum 62 that is mounted over a shaft 68. The shaft 68 is secured to the housing 70. A hand crank 64 is mechanically linked to the shaft 68, and rotating the hand crank in the desired direction causes the cable 60 to wind or unwind around the drum 62. A lock/release lever 66 may be provided to lock the shaft thereby preventing the cable from winding or unwinding. As well understood by those skilled in the art, one way in which the lock/release lever may be incorporated within the winch is by use of a ratchet mechanism (not shown) that is placed in the linkage between hand crank 64 and shaft 68. Additionally, the winch 58 may be power operated as opposed to manually operated. Accordingly, the winch 58 may be connected to a power source (not shown) such as a reversible motor that enables an operator to control the winding and unwinding of the cable 60 about the drum 62.

Now with reference to FIGS. 1-4, the operation of the lift device will be explained. As a first step, the animal carcass to be lifted is secured to the chain/strap 56. The chain/strap 56 is then connected to the second end of the rotatable arm 46. The second end of the rotatable arm may be rotated downwards in order to allow the second end of the rotatable arm to secure to the chain/strap 56. The animal carcass is then lifted to the appropriate height by rotation of the hand crank 64, and then locking the winch 58 once the animal carcass is lifted. The lid 18 of the incinerator is opened to receive the carcass C. The vertical support 40 is then rotated by securing either the first or second end of the arm 46 or by otherwise pushing the animal carcass C to rotate the vertical support such that the carcass is centered over the opening of the interior chamber 38. The carcass is then lowered by releasing the winch lock 66, and rotating the hand crank to lower the carcass. The carcass is disconnected from the chain/strap 56, the lid 18 is closed, and then the incinerator may be operated to incinerate the carcass.

The lift device of the present invention is easily integrated with many different styles or types of incinerators. The base 42 provides a convenient structure for which to attach the lift device to any type of vertically extending wall or support of an incinerator. Exact positioning of the carcass can be achieved by the dual rotation points, one located between the vertical support and base 42, and the other being the connection of the upper end of the vertical support 40 and the rotatable arm 46. The cable 60 and winch 58 allow a safe, precise control of the positioning of the carcass. Ultimately, the lift device of the present invention minimizes handling of carcasses and allows them to be incinerated within the more portable, smaller incinerator units that are increasingly found at various agricultural locations.

While the present invention has been set forth above in one or more preferred embodiments, it should be understood that various other changes and modifications of the invention can be made in accordance with the invention as described and the claims appended hereto.

What is claimed is:

1. In combination, an animal carcass incinerator and lift device, said combination comprising:
    (a) an incinerator including a plurality of sidewalls enclosing an interior chamber, a lid, and at least one burner for providing heat to the interior chamber thereby incinerating an animal carcass placed within the interior chamber;
    (b) a lift device secured to said incinerator and especially adapted for lifting animal carcasses for placement within an incinerator, said lift device comprising:
        (i) a stationary base attached to a sidewall of said incinerator;
        (ii) a support having first and second ends, said first end placed telescopically in said base, and said second end extending above said base, said first end being rotatable with respect to said stationary base to locate said second end of said arm over said interior chamber for loading an animal carcass therein;
(iii) an arm having first and second ends, said arm being rotatably connected to said second end of said support between said first and second ends of said arm;
(iv) a cable secured to said first end of said arm; and
(v) means for controlling the extension and retraction of the cable to the raise or lower said second end of said arm.

2. The combination, as claimed in claim 1, wherein:
said base of said lift device is secured to one of said sidewalls of said incinerator.

3. The combination, as claimed in claim 1, wherein:
said second end of said support extends above said lid.

4. A device, as claimed in claim 1, further including:
a plurality of rings spaced from one another and mounted adjacent said second end of said arm.

5. A device, as claimed in claim 1, further including:
a ring secured to said first end of said arm for connecting said cable to said first end of said arm.

6. A method of positioning an animal carcass for disposal within an incinerator, said method comprising the steps of:
providing an incinerator including a plurality of sidewalls enclosing an interior chamber, a burner assembly for heating said interior chamber, and a lid covering said interior chamber;
providing a lift device secured to a sidewall of said incinerator, said lift device including a base, a rotatable vertical support telescopically received in said base, and a rotatable arm secured to an upper end of said vertical support;
securing an animal carcass to an end of said rotatable arm;
rotating the rotatable arm to lift the animal carcass to a height above the lid;
rotating the rotatable vertical support to locate the animal carcass over the interior chamber;
opening the lid; and
lowering the carcass into the interior chamber by rotating the rotatable arm.

7. A method, as claimed in claim 6, wherein:
a plurality of rings spaced from one another and mounted adjacent said second end of said arm.

\* \* \* \* \*